(12) United States Patent
Ji et al.

(10) Patent No.: US 12,555,122 B2
(45) Date of Patent: Feb. 17, 2026

(54) OMNI-CHANNEL CONTEXT SHARING

(71) Applicant: Airbnb, Inc., San Francisco, CA (US)

(72) Inventors: Wei Ji, Beijing (CN); Xiang Lan, Beijing (CN); Jianqi Liao, Beijing (CN); Jiayu Lou, Redwood City, CA (US); Weihua Lou, Sammamish, WA (US); Chutian Wang, Mountain View, WA (US); Zhu Xiong, Mercer Island, WA (US); Zhiheng Xu, Santa Clara, CA (US); Can Yang, Beijing (CN); Keyao Yang, Beijing (CN); Ying Zhang, Palo Alto, CA (US); Yuyang Zhou, Seattle, WA (US)

(73) Assignee: Airbnb, Inc., San Francisco, CA (US)

( * ) Notice: Subject to any disclaimer, the term of this patent is extended or adjusted under 35 U.S.C. 154(b) by 86 days.

(21) Appl. No.: 18/383,622

(22) Filed: Oct. 25, 2023

(65) Prior Publication Data
US 2025/0078090 A1    Mar. 6, 2025

Related U.S. Application Data

(63) Continuation of application No. PCT/CN2023/116076, filed on Aug. 31, 2023.

(51) Int. Cl.
*G06Q 30/015* (2023.01)
*G06Q 10/02* (2012.01)
(Continued)

(52) U.S. Cl.
CPC ........... *G06Q 30/015* (2023.01); *G06Q 10/02* (2013.01); *G06Q 10/103* (2013.01); *G06Q 30/0613* (2013.01); *G06Q 30/01* (2013.01)

(58) Field of Classification Search
CPC .... G06Q 30/015; G06Q 10/02; G06Q 10/103; G06Q 30/0613; G06Q 30/01
See application file for complete search history.

(56) References Cited

U.S. PATENT DOCUMENTS 10,504,277 B1    12/2019  Haitani et al.
11,544,719 B1 *   1/2023  Fujimoto ................ G06F 40/30
(Continued)

FOREIGN PATENT DOCUMENTS

WO         2025043589        3/2025

OTHER PUBLICATIONS

Liu, Z., Long, C., Lu, X., Hu, Z., Zhang, J., & Wang, Y. (2019). Which channel to ask my question?: Personalized customer service request stream routing using deep reinforcement learning. IEEE Access, 7, 107744-107756. (Year: 2019).*

(Continued)

*Primary Examiner* — John S. Wasaff
(74) *Attorney, Agent, or Firm* — Schwegman Lundberg & Woessner, P.A.

(57) ABSTRACT

A session shared data system accesses a first communication between a user and a support agent on a first communication channel and stores communication data associated with the first communication in a session shared data object. The session shared data system accesses a subsequent communication between the user and a second agent on a second communication channel, receives a query associated with the subsequent communication and transmits the response to a device of the second agent.

20 Claims, 6 Drawing Sheets

(51) Int. Cl.
  *G06Q 10/10*  (2023.01)
  *G06Q 30/01*  (2023.01)
  *G06Q 30/0601* (2023.01)

(56) References Cited

U.S. PATENT DOCUMENTS

| | | | |
|---|---|---|---|
| 2017/0134316 A1* | 5/2017 | Cohen | H04L 51/216 |
| 2017/0324867 A1* | 11/2017 | Tamblyn | H04L 65/1093 |
| 2018/0027029 A1* | 1/2018 | Linder | G06Q 30/016 |
| | | | 709/204 |
| 2018/0191903 A1* | 7/2018 | Yokel | H04M 3/5232 |
| 2019/0266238 A1 | 8/2019 | Faulkner et al. | |
| 2019/0268385 A1 | 8/2019 | Faulkner et al. | |
| 2019/0391858 A1 | 12/2019 | Studnicka | |
| 2020/0374394 A1* | 11/2020 | Karp | H04L 63/0807 |
| 2021/0201327 A1* | 7/2021 | Konig | G06Q 30/015 |
| 2023/0259643 A1 | 8/2023 | Szigeti et al. | |

OTHER PUBLICATIONS

Singh, P. (2022). AI-Powered IVR and Chat: A New Era in Telecom Troubleshooting. Available at SSRN 5218979. (Year: 2022).*
"International Application Serial No. PCT CN2023 116076, International Search Report mailed May 15, 2024", 3 pgs.
"International Application Serial No. PCT CN2023 116076, Written Opinion mailed May 15, 2024", 4 pgs.

* cited by examiner

OMNI-CHANNEL CONTEXT SHARING

PRIORITY

This application claims the benefit of priority from International Application No. PCT/CN2023/116076, filed Aug. 31, 2023, which is incorporated by reference herein in its entirety.

TECHNICAL FIELD

Embodiments herein generally relate to data storage. More specifically, but not by way of limitation, systems and methods herein describe a session shared data object that can be accessed by multiple asynchronous communication sessions.

BACKGROUND

Positive customer support experiences are important to a business's success. As in-person interactions decrease, there is an increased demand for improved online solutions to customer support.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
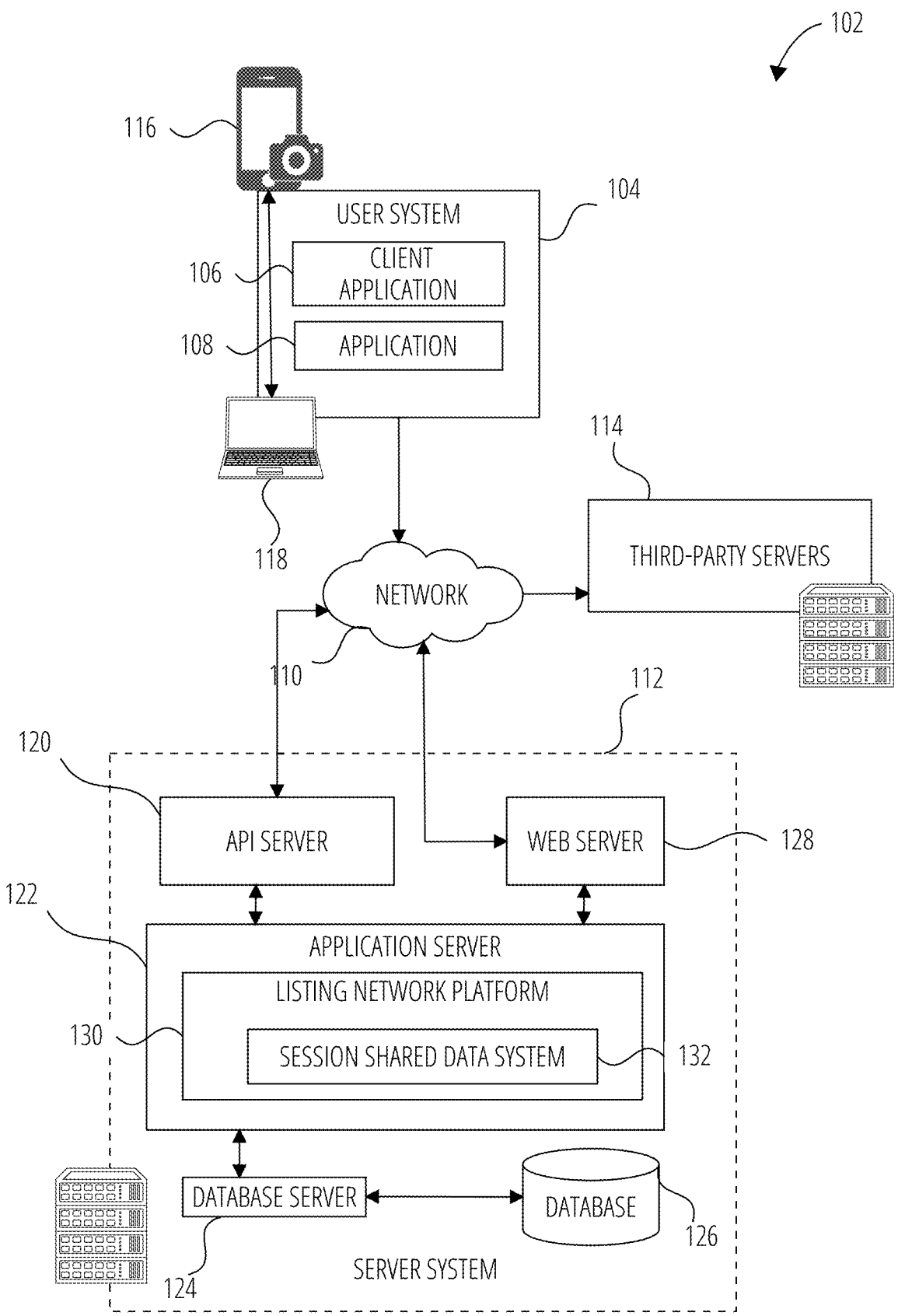
FIG. 1 is a diagrammatic representation of a networked environment in which the present disclosure may be deployed, according to some examples.

The paragraphs below describe systems and methods for sharing customer support information across multiple customer support communication channels. There is a need to improve customer support performance by integrating insights aggregated across multiple communication channels to infer conversational contexts. Traditionally, each communication between a customer and support agent is executed as individual workflow sessions. Therefore, different sessions are independent from each other, and the interactions between different communication channels are relatively limited. Exchanging data across varied communication channels can be limited by channel-specific and product-specific nuances. In some examples, a product is a specific set of workflows that are coordinated to serve a specific purpose. There can be multiple products operating in a single communication channel. Different channels can use distinct labels for identical data types. Aligning various products to a consistent interface for shared data generation often presents both technical and operational challenges. Furthermore, traditionally, it is common for different products to be associated with different databases for data storage. When the foundational databases are separate, constructing a unified and scalable strategy for data sharing becomes a technical challenge.

Embodiments herein describe a session shared data system that allows a workflow session that includes communication between a customer and a human or bot support agent to save shareable data in a data store and further allows other workflow sessions associated with the customer to retrieve the desired information from a data store. The communication can take place on a communication channel. A communication channel is a venue where a user, such as a customer and support agent, conducts communication. Some examples include email, a messaging platform with an artificial intelligence bot or a human user, and a phone call.

The session shared data system enables information to be shared across different workflow sessions that belong to the same user. This allows users to shift between different communication channels without losing context. Some example use cases include, information aggregation across communication channels and task handoffs. In the first example use case, when support agents are solving an issue for a specific user, the information collected in the entire user's history can be presented to a support agent visually to facilitate issue identification. In the second example use case, support agents may want to hand off some tasks to an automated process and then retrieve the collected information after the tasks have been completed. In the first use case, the information shared with support agents is likely to be generic information that captures fundamental customer support attributes such as contact reason, reservation information, case identification number, and so forth. In the second use case, the information used by the support agents and the automated process is likely to conform to a very specific interface that only the support agents and the automated process can recognize. Thus, it is important to differentiate between the two types of data described above in the session shared data system. Further details regarding the session shared data system are provided in the paragraphs below.

Networked Computing Environment

FIG. 1 is a block diagram showing an example networked system 102 for facilitating listing services (e.g., publishing goods or services for sale or barter, purchases of goods or services) over a network. The networked system 102 includes multiple user systems 104, each of which hosts multiple applications, including a client application 106 and other applications 108. Each client application 106 is communicatively coupled, via one or more communication networks including a network 110 (e.g., the Internet), to other instances of the client application 106 (e.g., hosted on respective other user systems 104), a server system 112 and third-party servers 114). A client application 106 can also communicate with other locally hosted applications 108 using Applications Program Interfaces (APIs).

Each user system 104 may include multiple user devices, such as a mobile device 116 and a computer client device 118 that are communicatively connected to exchange data and messages.

A client application 106 interacts with other client applications 106 and with the server system 112 via the network 110. The data exchanged between the client applications 106 and between the client applications 106 and the server system 112 includes functions (e.g., commands to invoke functions) and payload data (e.g., text, audio, video, or other multimedia data).

In some example embodiments, the client application 106 is a reservation application for temporary stays or experiences at hotels, motels, or residences managed by other end users (e.g., a posting end user who owns a home and rents out the entire home or private room). In some implementations, the client application(s) 106 include various components operable to present information to the end user and communicate with the networked system 102. In some embodiments, if the reservation application is included in the computer client device 118, then this application is configured to locally provide the user interface and at least some of the functionalities with the application configured to communicate with the networked system 102, on an as-needed basis, for data or processing capabilities not locally available (e.g., access to a database of items available for sale, to authenticate a user, to verify a method of payment). Conversely, if the reservation application is not included in the computer client device 118, the computer client device 118 can use its web browser to access an e-commerce site (or a variant thereof) hosted on the networked system 102.

The server system 112 provides server-side functionality via the network 110 to the client applications 108. While certain functions of the networked system 102 are described herein as being performed by either a client application 106 or by the server system 112, the location of certain functionality either within the client application 106 or the server system 112 may be a design choice. For example, it may be technically preferable to initially deploy particular technology and functionality within the server system 112 but to later migrate this technology and functionality to the client application 106 where a user system 104 has sufficient processing capacity.

The server system 112 supports various services and operations that are provided to the client application 106. Such operations include transmitting data to, receiving data from, and processing data generated by the client application 106. In some examples, this data includes message content, client device information, geolocation information, reservation information, transaction information, and message content. Data exchanges within the networked system 102 are invoked and controlled through functions available via user interfaces (UIs) of the client application 106.

Turning now specifically to the server system 112, an Application Program Interface (API) server 120 is coupled to and provides programmatic interfaces to application server 122, making the functions of the application server 122 accessible to the client application 106, other applications 108 and third-party server 114. The application server 122 is communicatively coupled to a database server 124, facilitating access to a database 126 that stores data associated with interactions processed by the application server 122. Similarly, a web server 128 is coupled to the application server 122 and provides web-based interfaces to the application server 122. To this end, the web server 128 processes incoming network requests over the Hypertext Transfer Protocol (HTTP) and several other related protocols.

The Application Program Interface (API) server 120 receives and transmits interaction data (e.g., commands and message payloads) between the application server 122 and the user systems 104 (and, for example, interaction client application 106 and other application 108) and the third-party server 114. Specifically, the Application Program Interface (API) server 120 provides a set of interfaces (e.g., routines and protocols) that can be called or queried by the client application 106 and other applications 108 to invoke functionality of the application server 122. The Application Program Interface (API) server 120 exposes various functions supported by the application server 122, including account registration and login functionality.

The application server 122 hosts the listing network platform 130 and the session shared data system 132 of which comprises one or more modules or applications and each of which can be embodied as hardware, software, firmware, or any combination thereof. The application server 122 is shown to be coupled to a database server 124 that facilitates access to one or more information storage repositories or database 126.

The listing network platform 130 provides a number of publication functions and listing services to the users who access the networked system 102. While the listing network platform 130 is shown in FIG. 1 to form part of the networked system 102, it will be appreciated that, in alternative embodiments, the listing network platform 130 may form part of a web service that is separate and distinct from the networked system 102. The listing network platform 130 can be hosted on dedicated or shared server machines that are communicatively coupled to enable communications between server machines. The listing network platform 130 provides a number of publishing and listing mechanisms whereby a seller (also referred to as a "first user," posting user, host) can list (or publish information concerning) goods or services for sale or barter, a buyer (also referred to as a "second user," searching user, guest) can express interest in or indicate a desire to purchase or barter such goods or services, and a transaction (such as a trade) can be completed pertaining to the goods or services.

In some examples, the listing network platform 130 also comprises an automation platform. The automation platform is used to provide customer service functionalities to assist a seller or a buyer. In some examples, the automation platform includes reusable actions and conditions that let operators create workflows. The automation platform may be backed by a central workflow engine, such as a state machine. In some examples, the automation platform has three main components: an event orchestrator, a workflow engine, and an action store. The event orchestrator is an input/output (I/O) layer that encapsulates communication channel specific idiosyncrasies. The workflow engine is responsible for managing and execution all the workflows powered by the platform. The action store handles all action executions requested by the workflow engine.

The session shared data system 132 generates a session shared data object that stores communication data between a customer and a support agent during a workflow session. The session shared data object is accessible by other workflow sessions associated with the customer to improve conversational context of customer support capabilities on the listing network platform 130. Further details of the session shared data system 132 are provided below.

Figure 2:
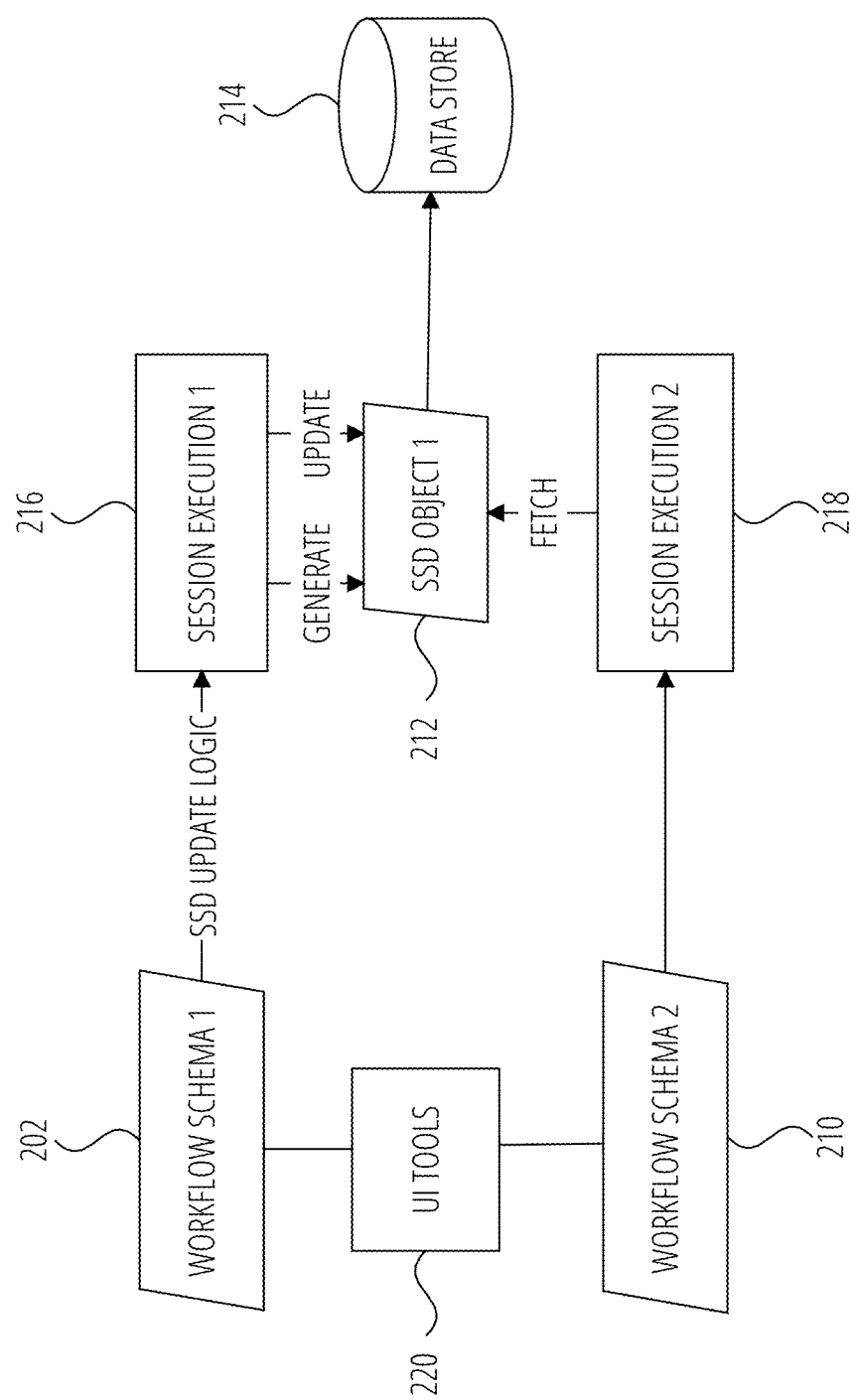
FIG. 2 is an illustration of a session shared data system architecture, according to example embodiments.

FIG. 2 is an illustration of a session shared data system 132 architecture, according to example embodiments. An operator of the session shared data system 132, such as an operator of the listing network platform 130, can use user interface (UI) tools 220 to generate workflow schemas, such as workflow schema 1 (202) and workflow schema 2 (210) for executing a workflow session (e.g., session execution 1 (216) and session execution 2 (218).

The workflow schema (e.g., 202, 210) is a structured representation of a workflow, which describes a sequence of tasks, any independencies and potential outcomes. The schema provides a blueprint of how a process or set of tasks should be executed from start to end. The workflow schema contains nodes, transitions, and start and end points. Nodes are individual units of work in a workflow. Each node represents a specific action. Example actions include read actions (data fetching or machine learning predictions) and write actions (like sending messages or issuing refunds). Transitions define how a process can move from one node to the next node. The transitions may be based on certain conditions or constraints of the session shared data system 132. Each workflow further has a defined start and a set of end points.

A workflow session is a runtime object that contains the information that enables the workflow schema to execute. The workflow session defines processes for the listing network platform 130 such as canceling existing reservations, adding a new listing, or reporting issues with a listing. The workflow session typically contains session variables, a workflow schema, an action dispatcher and state management. Session variables include some runtime variables that are generated by a specific node during runtime. The session variables are managed and preserved by the workflow session so that they can be accessible by future nodes. As mentioned above, the workflow schema is a blueprint for a given workflow. The workflow session needs to maintain the workflow schema in memory and constantly refers back to the schema to determine the actions it needs to perform. The action dispatcher dispatches tasks to an action store and obtains its results. The workflow session needs to utilize state management to save the current session status as a checkpoint in a database. When the session is resumed due to subsequent user requests, the session status can be recreated by loading data from the database.

The session shared data (SSD) object 1 (212) is a data object that contains public information about a workflow session. In some examples, the SSD object 1 (212) has two main attributes: domain specific data and product specific data. Domain specific data contains generic attributes that are universal across many products in a domain. For example, domain specific data includes reservation identification number, a contact reason, a ticket identification number, and payment data. Product specific data contains any non-generic information that the communication session wants to expose. In some examples, the product specific data is specific to the communication channel itself.

In some examples, the domain specific data is defined in an interface description language (IDL) file such as APACHE THRIFT. The product specific data can similarly be defined in an IDL file, or the structure of the product specific data can be dynamically defined by an operator of the session shared data system 132 or listing network platform 130 via UI tools 220. In some examples, both the domain specific data and the product specific data have an explicit interface to establish a common protocol between a data producer and a data consumer. The interface presents a clearly defined structure that specifies the collection of fields contained in the domain-specific or product-specific data, and the datatype of each field (e.g., string, integer, object, etc.). A common protocol across diverse products is essential to ensure that product-specific idiosyncrasies are stripped away. For example, while a chatbot product might internally refer to a listing identification as "listingNumber", an interactive voice response (IVR) product might refer to a listing identification as "listingID." Thus, it is crucial to establish a standardized abstraction across products when generating the SSD object. This ensures operators can bypass the intricacies of other products' internal logic when accessing data such as a listing identification. Domain specific data can have the same interface for different products that are within the same domain while product specific data can have different interfaces for different products.

The SSD data object comprises metadata, such as product name, communication channel, and/or session ID, that is derived from the workflow session that generates the SSD object. Every SSD object can be updated by multiple workflows if the workflows are used in the same session. The life cycle of the SSD object can go beyond the lifespan of the workflow session that created it. Once created, the SSD object will continue to exist and can be referenced by other workflow sessions. In some examples, the generation of the SSD object follows a "create when first update approach" which means that the session shared data system 132 will check if the SSD object is already present to update an SSD data object for a workflow session. If the SSD object is not present, a new record (e.g., a new SSD object) is created in the data store 214. In some examples, every workflow session (e.g., session execution 1 (216) can write to only one SSD object (e.g., SSD object 1 (212)). One workflow session, however, can read from multiple SSD objects.

The SSD object is a strongly typed object with an explicit schema and data definition. During runtime, the SSD can be treated as a weakly typed object by the session shared data system 132. For example, during runtime, the SSD object can be treated as a Javascript Object Notation (JSON) object and is treated as a single field in the data store 214. In particular, the domain specific data and the product specific data can be stored in a weakly typed data object, such as a string. If each of the domain specific data, the product specific data, and the metadata of the SSD object are treated as separate fields, then the session shared data system would require multiple interfaces and multiple data storage solutions. But because the SSD object is treated as a single field (as a weakly typed object), only the interfaces for each type of data in the SSD object need to be modified, which thereby improves the efficiency of the session shared data system 132.

An operator of the session shared data system 132, can use UI tools 220 to generate workflow schema 1 (202) and workflow schema 2 (210). Session execution 1 (216) uses the workflow schema 1 (202) to execute and generates and updates the SSD object 1 (212). Session execution 1 (216) can access SSD objects from other workflow session under the same user. Session execution 2 (210) uses the workflow schema 2 (210) to execute the workflow session. Session execution 2 (210) can fetch data from SSD object 1 (212) from the data store 214.

Figure 3:
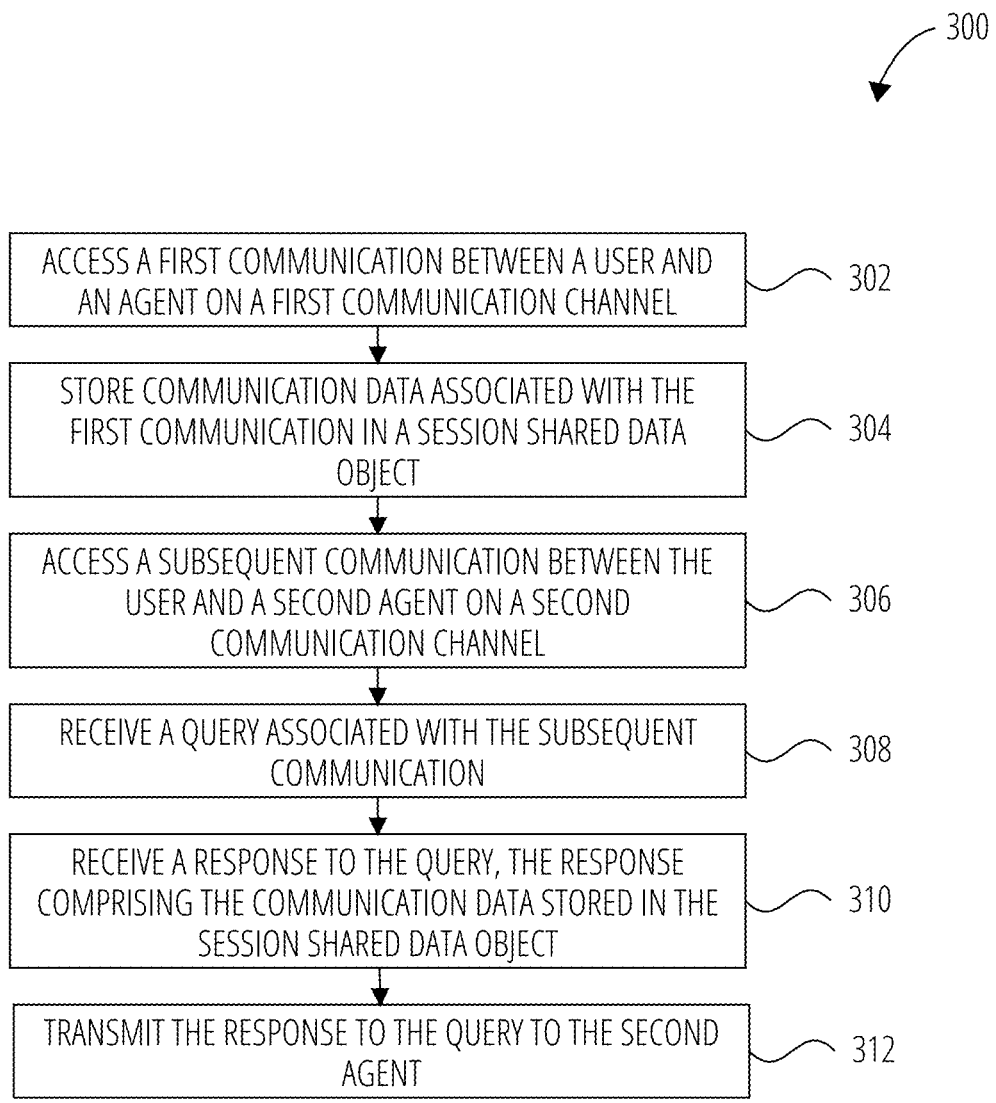
FIG. 3 illustrates a process for generating a session shared data object, in accordance with one example.

FIG. 3 illustrates a process 300 for generating a SSD object, in accordance with some examples. One or more processors of a computing device or system, such as the processor in a listing network platform 130, the processor in a session shared data system 132, the processor in a networked system 102, the processor in the user systems 104, the processor in the server system 112 or any combination thereof, can perform the operations in process 300.

In operation 302, a computing system accesses a first communication between a user and an agent on a first communication channel. In some examples, the user is a customer of the listing network platform 130 and the agent is a support agent of the listing network platform 130. The support agent may be a human agent or a bot agent that operates on a messaging platform, an IVR platform, or any other suitable platform.

In some examples, the first communication is accessed from a first workflow session, such as session execution 1 (216) shown in FIG. 2, on a central workflow engine. The first workflow session comprises a first workflow schema, such as workflow schema 1 (202). For example, the first communication may be an inquiry from a customer for assistance with setting up a new listing on the listing network platform 130. The first communication may take place on a messaging platform channel with a bot support agent. In order to assist with setting up a new listing, the bot support agent initiates a first workflow session which is defined using the first workflow schema.

In operation 304, the computing system stores communication data associated with the first communication in an SSD object (e.g., SSD object 1 212). The SSD object stores metadata, domain-specific data, and product-specific data associated with the first workflow session. For example, the SSD object stores the user actions that were generated during the first workflow session. In accordance with the above example, the SSD object stores any pictures that the user uploaded of their listing as part of the first workflow session. In some examples, the SSD object is generated based on the first workflow schema. For example, the workflow schema can direct the workflow session to either create or update an SSD via actions. In some examples, the workflow schema includes an update action that updates an existing SSD object if one is present and creates a new SSD object if none are associated with a particular workflow session. The update action can be incorporated into any node within the workflow schema. The workflow schema can further control content saved in the SSD object by constructing a key-value map, which draws from runtime variable produced during the workflow session execution. For example, if there is a need to store a reservation identification number at a particular stage, the schema inserts a node that triggers the update action described above.

In operation 306, the computing system accesses a subsequent communication between the user and a second agent on a second communication channel. In some examples, the first communication channel is a different type of channel from the second communication channel. For example, based on the above example, the first communication channel may be a messaging platform with a first bot support agent and the second communication channel may be an interactive voice response (IVR) phone call with a second bot support agent. The subsequent communication is accessed from a second workflow session (e.g., session execution 2 218) on the central workflow engine. In this example, the second workflow session is initiated at any point in time after initiation of the first workflow session. For example, during the first communication, the user may ask to complete the steps for listing their reservation at another point in time and asks to do so over a phone call instead of on a messaging platform. The next steps will then be initiated by the second agent via an IVR platform as part of a second workflow session.

In operation 308, the computing system receives a query associated with the subsequent communication. For example, the query can comprise a request to access the SSD object (e.g., fetch the SSD object 1 212). For example, an operator of the session shared data system 132 uses computer programming code, such as by using SQL or any suitable programming language, to query the data store 214 for one or more SSD objects associated with the user. In some examples the session shared data system 132 includes a query interface that filters and sorts fields in metadata of SSD objects, the domain specific data attributes and the product specific data attributes of an SSD object. In some examples, the session shared data system 132 automatically queries the data store 214. For example, based on the second workflow session, the session shared data system 132 accesses predefined queries to automatically query the data store 214.

In operation 310, the computing system receives a response to the query. The response to the query is an SSD object that matches the filters or search parameters of the query. The retrieved SSD object is associated with the same user.

In operation 312, the computing system transmits the response to the query to a device of the second agent. For example, the retrieved SSD object is provided as input to a succeeding node in the second workflow session. The second workflow session then utilizes the SSD object data to help assist the user. For example, using the example above, the IVR product retrieves the SSD object from the messaging platform product. This SSD object is passed to a subsequent node in the second workflow session to determine if a particular help article has already been suggested to a user, ensuring that the same article is not redundantly recommended.

Figure 4:
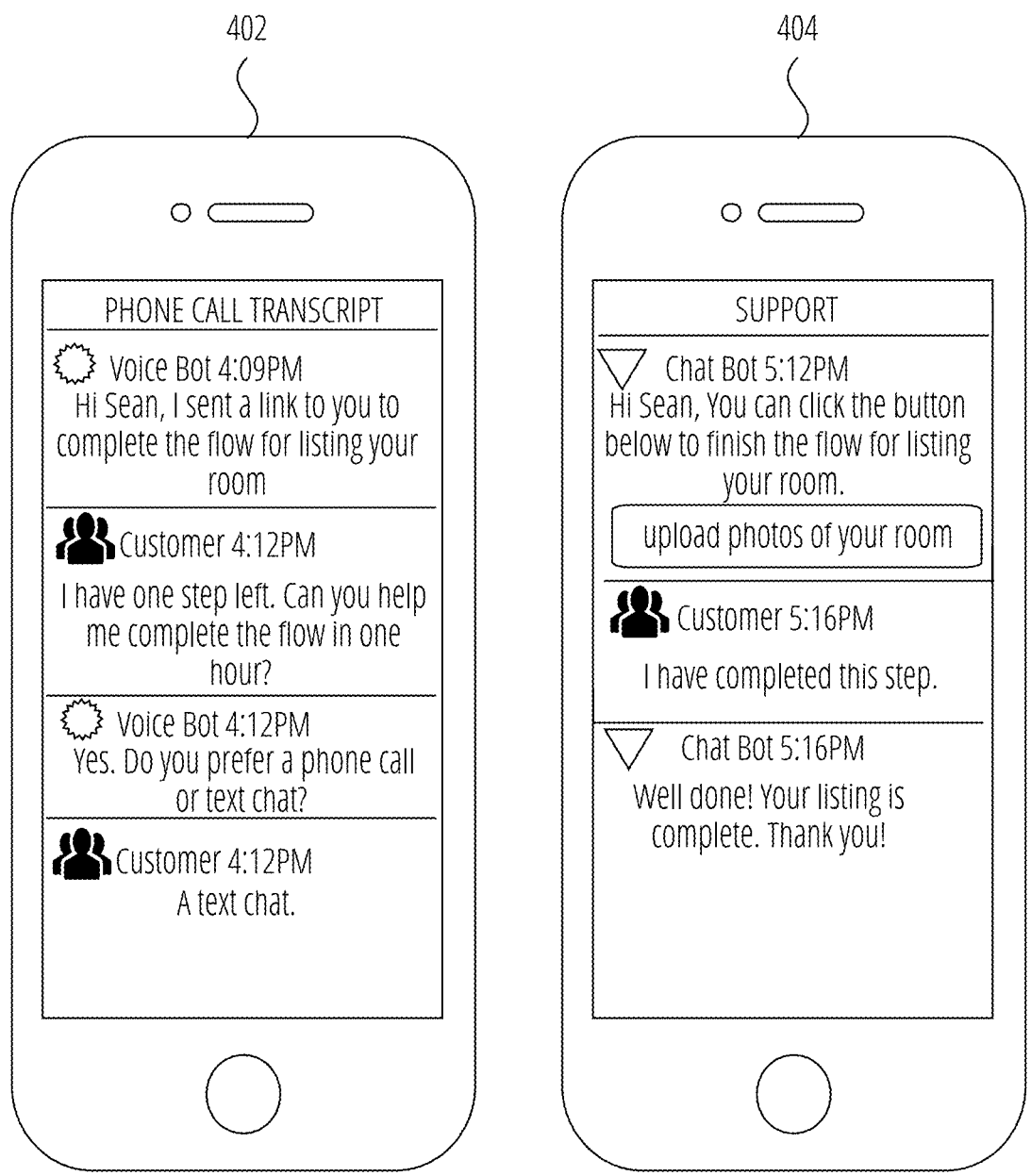
FIG. 4 is an example illustration of a conversation on a listing network platform that uses the session shared data system to provide conversational context in customer support.

FIG. 4 is an example illustration of a conversation on a listing network platform 130 that uses the session shared data system 132 to provide conversational context in customer support, according to example embodiments. User interface 402 is a phone call transcript of a conversation between a customer and a support agent. The phone call is a first type of communication channel and the support agent is a first support agent. In the transcript, the customer asks for the conversation to be continued on a different conversation channel. User interface 404 is a continuation of the conversation between the customer and a different support agent. The continuation of the conversation occurs on a second type of communication channel that is different from the first type of communication channel. For example, the continuation of the conversation occurs on a messaging platform. The support agent is a second support agent. The session shared data system 132 queries the data store 214 for the most recent SSD object associated with the customer. The data store 214 provides the SSD object created during a first workflow session associated with the phone call to a second workflow session associated with the messaging platform. Thus, the customer does not have to repeat the context for the different support agent because the different support agent has access to the SSD object created during a workflow session associated with the phone call and can efficiently assist the customer using the information in the SSD object.

Machine Architecture

Figure 5:
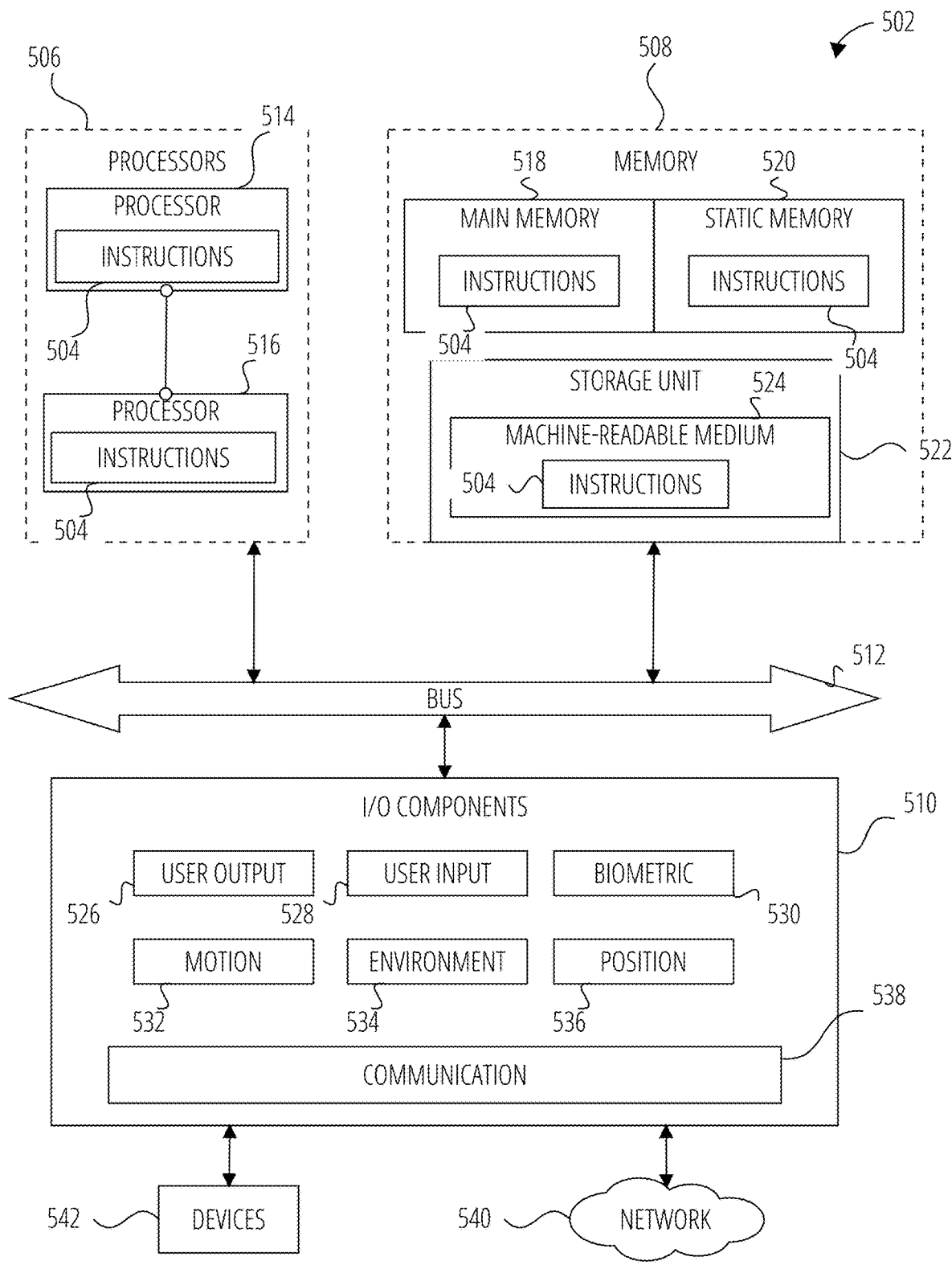
FIG. 5 is a diagrammatic representation of a machine in the form of a computer system within which a set of instructions may be executed to cause the machine to perform any one or more of the methodologies discussed herein, according to some examples.an aspect of the subject matter in accordance with one embodiment.

FIG. 5 is a diagrammatic representation of the machine 502 within which instructions 504 (e.g., software, a program, an application, an applet, an app, or other executable code) for causing the machine 502 to perform any one or more of the methodologies discussed herein may be executed. For example, the instructions 504 may cause the machine 502 to execute any one or more of the methods described herein. The instructions 504 transform the general, non-programmed machine 502 into a particular machine 502 programmed to carry out the described and illustrated functions in the manner described. The machine 502 may operate as a standalone device or may be coupled (e.g., networked) to other machines. In a networked deployment, the machine 502 may operate in the capacity of a server machine or a client machine in a server-client network environment, or as a peer machine in a peer-to-peer (or distributed) network environment. The machine 502 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 504, sequentially or otherwise, that specify actions to be taken by the machine 502. Further, while a single machine 502 is illustrated, the term "machine" shall also be taken to include a collection of machines that individually or jointly execute the instructions 504 to perform any one or more of the methodologies discussed herein. The machine 502, for example, may comprise the user system 104 or any one of multiple server devices forming part of the server system 112. In some examples, the machine 502 may also comprise both client and server systems, with certain operations of a particular method or algorithm being performed on the server-side and with certain operations of the particular method or algorithm being performed on the client-side.

The machine 502 may include processors 506, memory 508, and input/output I/O components 510, which may be configured to communicate with each other via a bus 512. In an example, the processors 506 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 514 and a processor 514 that execute the instructions 504. The term "processor" is intended to include multi-core processors that may comprise two or more independent processors (sometimes referred to as "cores") that may execute instructions contemporaneously. Although FIG. 5 shows multiple processors 506, the machine 502 may include a single processor with a single-core, a single processor with multiple cores (e.g., a multi-core processor), multiple processors with a single core, multiple processors with multiple cores, or any combination thereof.

The memory 508 includes a main memory 518, a static memory 520, and a storage unit 522, both accessible to the processors 506 via the bus 512. The main memory 518, the static memory 520, and storage unit 522 store the instructions 504 embodying any one or more of the methodologies or functions described herein. The instructions 504 may also reside, completely or partially, within the main memory 518, within the static memory 520, within machine-readable medium 524 within the storage unit 522, within at least one of the processors 506 (e.g., within the processor's cache memory), or any suitable combination thereof, during execution thereof by the machine 502.

The I/O components 510 may include a wide variety of components to receive input, provide output, produce output, transmit information, exchange information, capture measurements, and so on. The specific I/O components 510 that are included in a particular machine will depend on the type of machine. For example, portable machines such as mobile phones may include a touch input device or other such input mechanisms, while a headless server machine will likely not include such a touch input device. It will be appreciated that the I/O components 510 may include many other components that are not shown in FIG. 5. In various examples, the I/O components 510 may include user output components 526 and user input components 528. The user output components 526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 510 may include biometric components 530, motion components 532, environmental components 534, or position components 536, among a wide array of other components. For example, the biometric components 530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 532 include acceleration sensor components (e.g., accelerometer), gravitation sensor components, rotation sensor components (e.g., gyroscope).

The environmental components 534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 104 may have a camera system comprising, for example, front cameras on a front surface of the user system 104 and rear cameras on a rear surface of the user system 104. The front cameras may, for example, be used to capture still images and video of a user of the user system 104 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 104 may also include a 360° camera for capturing 360° photographs and videos.

Further, the camera system of the user system 104 may include dual rear cameras (e.g., a primary camera as well as a depth-sensing camera), or even triple, quad or penta rear camera configurations on the front and rear sides of the user system 104. These multiple cameras systems may include a wide camera, an ultra-wide camera, a telephoto camera, a macro camera, and a depth sensor, for example.

The position components 536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 510 further include communication components 538 operable to couple the machine 502 to a network 540 or devices 542 via respective coupling or connections. For example, the communication components 538 may include a network interface component or another suitable device to interface with the network 540. In further examples, the communication components 538 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 542 may be another machine or any of a wide variety of peripheral devices (e.g., a peripheral device coupled via a USB).

Moreover, the communication components 538 may detect identifiers or include components operable to detect identifiers. For example, the communication components 538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 538, such as location via Internet Protocol (IP) geolocation, location via Wi-Fi® signal triangulation, location via detecting an NFC beacon signal that may indicate a particular location, and so forth.

The various memories (e.g., main memory 518, static memory 520, and memory of the processors 506) and storage unit 522 may store one or more sets of instructions and data structures (e.g., software) embodying or used by any one or more of the methodologies or functions described herein. These instructions (e.g., the instructions 504), when executed by processors 506, cause various operations to implement the disclosed examples.

The instructions 504 may be transmitted or received over the network 540, using a transmission medium, via a network interface device (e.g., a network interface component included in the communication components 538) and using any one of several well-known transfer protocols (e.g., hypertext transfer protocol (HTTP)). Similarly, the instructions 504 may be transmitted or received using a transmission medium via a coupling (e.g., a peer-to-peer coupling) to the devices 542.

Software Architecture

Figure 6:
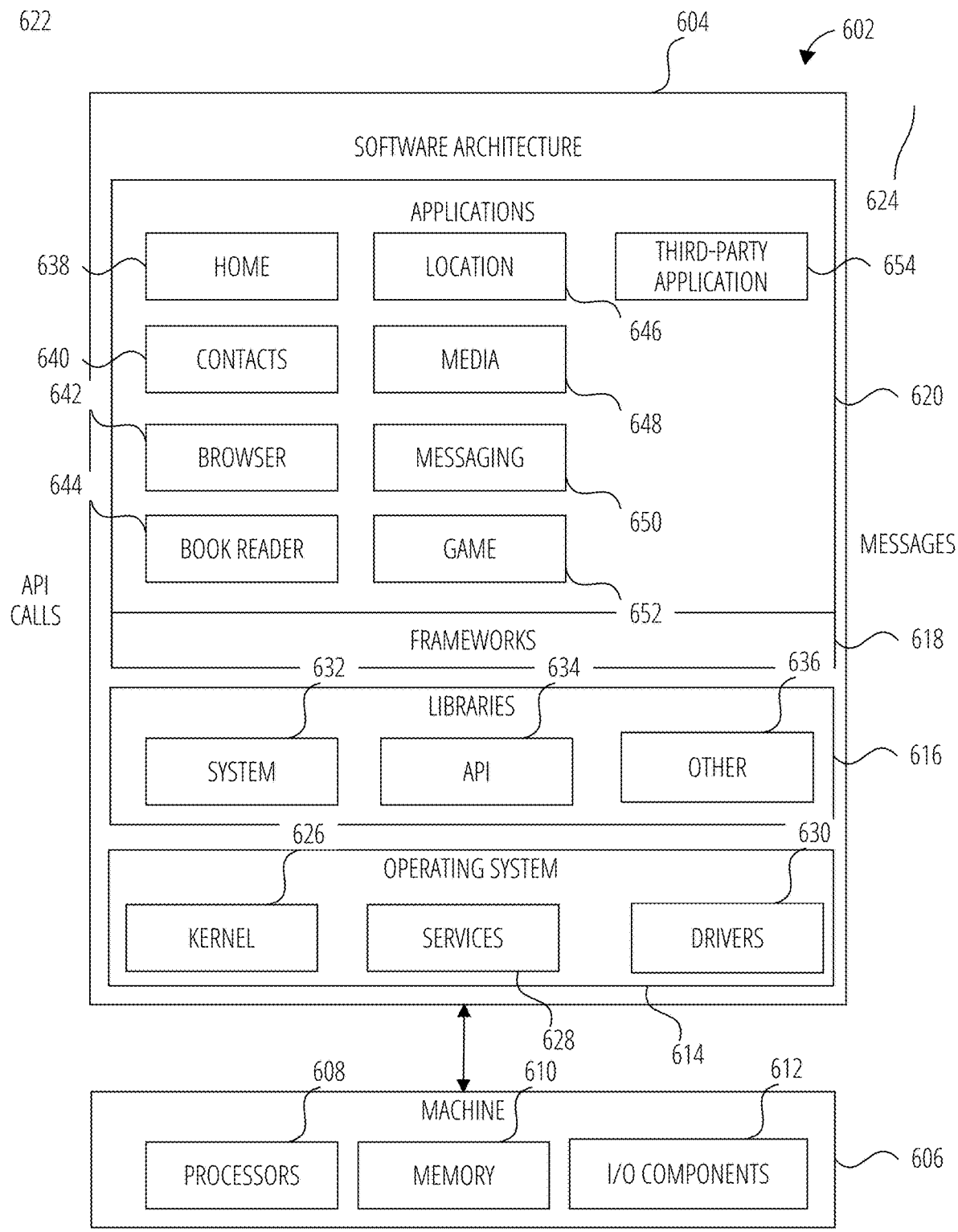
FIG. 6 is a block diagram showing a software architecture within which examples may be implemented.

FIG. 6 is a block diagram 602 illustrating a software architecture 604, which can be installed on any one or more of the devices described herein. The software architecture 604 is supported by hardware such as a machine 606 that includes processors 608, memory 610, and I/O components 612. In this example, the software architecture 604 can be conceptualized as a stack of layers, where each layer provides a particular functionality. The software architecture 604 includes layers such as an operating system 614, libraries 616, frameworks 618, and applications 620. Operationally, the applications 620 invoke API calls 622 through the software stack and receive messages 624 in response to the API calls 622.

The operating system 614 manages hardware resources and provides common services. The operating system 614 includes, for example, a kernel 626, services 628, and drivers 630. The kernel 626 acts as an abstraction layer between the hardware and the other software layers. For example, the kernel 626 provides memory management, processor management (e.g., scheduling), component management, networking, and security settings, among other functionalities. The services 628 can provide other common services for the other software layers. The drivers 630 are responsible for controlling or interfacing with the underlying hardware. For instance, the drivers 630 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 616 provide a common low-level infrastructure used by the applications 620. The libraries 616 can include system libraries 632 (e.g., C standard library) that provide functions such as memory allocation functions, string manipulation functions, mathematic functions, and the like. In addition, the libraries 616 can include API libraries 634 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 616 can also include a wide variety of other libraries 636 to provide many other APIs to the applications 620.

The frameworks 618 provide a common high-level infrastructure that is used by the applications 620. For example, the frameworks 618 provide various graphical user interface (GUI) functions, high-level resource management, and high-level location services. The frameworks 618 can provide a broad spectrum of other APIs that can be used by the applications 620, some of which may be specific to a particular operating system or platform.

In an example, the applications 620 may include a home application 638, a contacts application 640, a browser application 642, a book reader application 644, a location application 646, a media application 648, a messaging application 650, a game application 652, and a broad assortment of other applications such as a third-party application 654. The applications 620 are programs that execute functions defined in the programs. Various programming languages can be employed to create one or more of the applications 620, structured in a variety of manners, such as object-oriented programming languages (e.g., Objective-C, Java, or C++) or procedural programming languages (e.g., C or assembly language). In a specific example, the third-party application 654 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 654 can invoke the API calls 622 provided by the operating system 614 to facilitate functionalities described herein.

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components may provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and may operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:
1. A method comprising:
   initiating, via an interactive voice response (IVR) platform over an IVR communication channel, a first workflow session defined using a first workflow schema comprising a first sequence of tasks represented as nodes in the first workflow schema;
   storing user actions generated during the first workflow session in a session shared data object configured according to a common protocol defined by an interface description language (IDL) to align data fields across communication channels;
   associating the session shared data object with a user who performed the user actions;
   initiating, via an artificial intelligence (AI) bot on a text messaging communication channel, a second workflow session defined using a second workflow schema comprising a second sequence of tasks represented as nodes in the second workflow schema, wherein the session shared data object provides continuity between corresponding nodes of the first and second workflow schema;
   retrieving, by the AI bot through an event orchestrator that encapsulates channel-specific idiosyncrasies, the session shared data object associated with the user;

inputting the session shared data object associated with the user into a node in the second workflow session to re-establish a workflow state corresponding to at least one node of the first workflow schema; and resuming a conversation initiated via the IVR platform, by the AI bot, based on the re-established workflow state and the second workflow session.

2. The method of claim 1, wherein the first workflow schema further comprises transitions, and start and end points.

3. The method of claim 1, wherein the session shared data object is generated using the first workflow schema, the first workflow schema comprising an action to create the session shared data object.

4. The method of claim 1, wherein each node in the first workflow schema represents a specific action.

5. The method of claim 1, wherein the first workflow session is a runtime object that contains information that enables the first workflow schema to execute.

6. The method of claim 1, wherein the first workflow session and the second workflow session each define a process for a listing network platform.

7. The method of claim 1, wherein the first workflow session contains session variables generated by a specific node during runtime.

8. The method of claim 1, wherein the session shared data object comprises domain specific data and product specific data.

9. The method of claim 8, wherein the domain specific data comprises generic attributes that are universal across many products in a domain.

10. The method of claim 8, wherein product specific data contains any non-generic information that a communication session wants to expose.

11. The method of claim 8, wherein the product specific data is specific to the IVR communication channel.

12. The method of claim 1, wherein the session shared data object can be updated by multiple workflows used in a same session.

13. The method of claim 1, wherein the session shared data object can be referenced by different workflow sessions.

14. The method of claim 1, wherein the session shared data object comprises at least one picture that a user uploaded as part of the first workflow session.

15. A computing system comprising:
a processor; and
a memory storing instructions that, when executed by the processor, configure the computing system to perform operations comprising:
initiating, via an interactive voice response (IVR) platform over an IVR communication channel, a first workflow session defined using a first workflow schema comprising a first sequence of tasks represented as nodes in the first workflow schema;
storing user actions generated during the first workflow session in a session shared data object configured according to a common protocol defined by an interface description language (IDL) to align data fields across communication channels;
associating the session shared data object with a user who performed the user actions;
initiating, via an artificial intelligence (AI) bot on a text messaging communication channel, a second workflow session defined using a second workflow schema comprising a second sequence of tasks represented as nodes in the second workflow schema, wherein the session shared data object provides continuity between corresponding nodes of the first and second workflow schema;
retrieving, by the AI bot through an event orchestrator that encapsulates channel-specific idiosyncrasies, the session shared data object associated with the user;
inputting the session shared data object associated with the user into a node in the second workflow session to re-establish a workflow state corresponding to at least one node of the first workflow schema; and
resuming a conversation initiated via the IVR platform, by the AI bot, based on the re-established workflow state and the second workflow session.

16. The computing system of claim 15, wherein the first workflow schema further comprises transitions, and start and end points.

17. The computing system of claim 15, wherein the session shared data object is generated using the first workflow schema, the first workflow schema comprising an action to create the session shared data object.

18. A non-transitory computer-readable storage medium, the computer-readable storage medium including instructions that when executed by a computer, cause the computer to perform operations comprising:
initiating, via an interactive voice response (IVR) platform over an IVR communication channel, a first workflow session defined using a first workflow schema comprising a first sequence of tasks represented as nodes in the first workflow schema;
storing user actions generated during the first workflow session in a session shared data object configured according to a common protocol defined by an interface description language (IDL) to align data fields across communication channels;
associating the session shared data object with a user who performed the user actions;
initiating, via an artificial intelligence (AI) bot on a text messaging communication channel, a second workflow session defined using a second workflow schema comprising a second sequence of tasks represented as nodes in the second workflow schema, wherein the session shared data object provides continuity between corresponding nodes of the first and second workflow schema;
retrieving, by the AI bot through an event orchestrator that encapsulates channel-specific idiosyncrasies, the session shared data object associated with the user;
inputting the session shared data object associated with the user into a node in the second workflow session to re-establish a workflow state corresponding to at least one node of the first workflow schema; and
resuming a conversation initiated via the IVR platform, by the AI bot, based on the re-established workflow state and the second workflow session.

19. The non-transitory computer-readable storage medium of claim 18, wherein the first workflow schema further comprises transitions, and start and end points.

20. The non-transitory computer-readable storage medium of claim 18, wherein the session shared data object is generated using the first workflow schema, the first workflow schema comprising an action to create the session shared data object.

* * * * *